United States Patent [19]

Weinwurm et al.

[11] Patent Number: 5,490,907
[45] Date of Patent: *Feb. 13, 1996

[54] METHOD FOR TREATING SLUDGES

[75] Inventors: Peter Weinwurm; Paul S. Weinwurm, both of Brampton, Canada

[73] Assignee: Agglo Inc., Rexdale, Canada

[ * ] Notice: The term of this patent shall not extend beyond the expiration date of Pat. No. 5,087,375.

[21] Appl. No.: 134,436

[22] Filed: Oct. 12, 1993

Related U.S. Application Data

[63] Continuation-in-part of Ser. No. 703,944, May 22, 1991, abandoned, which is a continuation-in-part of Ser. No. 299,979, Jan. 23, 1989, Pat. No. 5,087,375.

[51] Int. Cl.$^6$ .............................. B01D 3/10; B01D 15/00
[52] U.S. Cl. .................. 203/29; 203/50; 203/91; 203/100; 203/41; 159/47.3; 159/DIG. 3; 159/DIG. 16; 159/DIG. 26; 202/175; 202/205; 210/664; 210/667; 210/688; 210/751; 264/66
[58] Field of Search .................. 203/29, 38, 28, 203/33, 36, 100, 50, 91, 41; 159/DIG. 16, DIG. 26, 47.3, DIG. 3, 905; 202/205, 170, 175; 210/664, 667, 688, 751; 264/66

[56] References Cited

U.S. PATENT DOCUMENTS

| | | | |
|---|---|---|---|
| 3,528,179 | 9/1970 | Smith | 159/DIG. 3 |
| 3,654,705 | 4/1972 | Smith et al. | 159/DIG. 3 |
| 3,926,129 | 12/1975 | Wall | 159/DIG. 3 |
| 3,997,406 | 12/1976 | Arranitakis | 202/175 |
| 4,219,589 | 8/1980 | Niks et al. | 159/DIG. 3 |
| 4,750,274 | 6/1988 | Erdman et al. | 34/180 |
| 4,864,942 | 9/1989 | Fochtman et al. | 110/226 |
| 4,872,993 | 10/1989 | Harrison | 210/666 |
| 4,882,067 | 11/1989 | Johnson et al. | 210/688 |
| 5,087,375 | 2/1992 | Weinwurm | 210/688 |
| 5,200,033 | 4/1993 | Weitzman | 159/47.3 |
| 5,314,579 | 5/1994 | Sun | 159/DIG. 3 |

Primary Examiner—Wilbur Bascomb, Jr.
Attorney, Agent, or Firm—Arne I. Fors; Jeffrey T. Imai; D. Doak Horne

[57] ABSTRACT

A method for the separation and recovery of volatiles from a sludge containing about 1 to 80% by weight liquid solvents and 20 to 99% by weight solids, in which said sludge is fed with a reagent powder material in an amount effective to form a mixture having a high surface area to a distillation vessel, said mixture is heated to a temperature up to about 350° C. while said mixture is advanced through the vessel for a time sufficient to distil a sufficient portion of the solvents to yield a solid residue powder, distilled solvents are condensed, and the solid residue powder recovered. The vessel preferably is a mechanical fluidized bed distillation vessel and said mixture is fluidized while being heated therein under a partial vacuum in a non-oxidizing atmosphere. The effective amount of reagent powder material includes about 5 to 70 wt % of the reagent powder material.

14 Claims, 3 Drawing Sheets

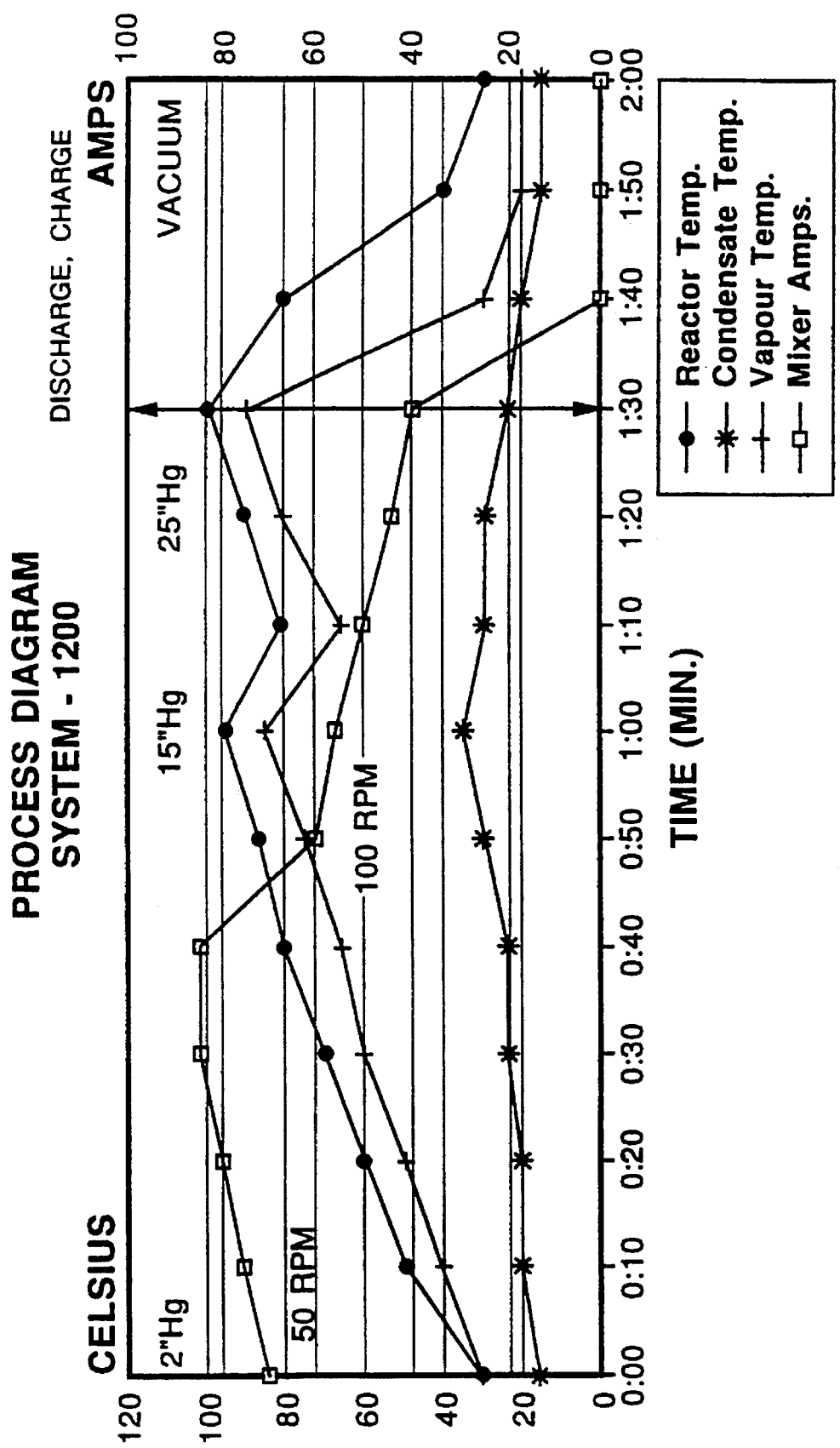

METHOD FOR TREATING SLUDGES

This application is a continuation-in-part of application Ser. No. 07/703,944 filed on May 22, 1991 now abandoned which is a continuation-in-part of application Ser. No. 07/299,979 filed on Jan. 23, 1989 now U.S. Pat. No. 5,087,375.

FIELD OF THE INVENTION

This invention relates to a method and apparatus for the treatment of organic sludges and, more particularly, relates to a method and apparatus for the recovery of volatiles from an organic sludge containing liquid solvents and resins and for rendering solid materials substantially chemically inert.

BACKGROUND OF THE INVENTION

Australian Patent No. 80703/87 discloses a method and apparatus for forming a solid aggregate from municipal waste in which the waste is mixed with a binding material to form pellets and the pellets are passed through heating stages in which volatiles in the pellets are burned at a temperature of about 650° C. and through oxidation/vitrification stages in which a portion of remaining volatiles and carbon in pellets are oxidized in an atmosphere of excess oxygen to raise the temperature to 1100° C. The silicates in the pellets are then vitrified by burning remaining volatiles to raise the temperature to 1200° C.

U.S. Pat. No. 4,864,942 teaches a process and apparatus for separating volatile organic chemicals and the like from soils or sludges in which the contaminated soils or sludges are subjected to a temperature treatment to volatilize the organic compounds for continuous removal and condensation.

U.S. Pat. No. 4,882,067 discloses a process for chemical bonding of heavy metals from inorganic sludges in the silicate structure of clays and shale. This patent discloses the use of clay or shale relative to liquid waste in a range of between 1:1 and 40:1, equivalent to 2.5 to 50% waste in the resulting mixture. The technology of this Patent essentially is directed to replacement of fuel in a commercially known process for producing aggregates from high organic wastes having a high energy value. Emphasis is placed on using municipal waste as a source of energy and not for rendering the waste inert and insoluble.

U.S. Pat. No. 4,872,993 discloses a method comprising adding clay and a flocculating agent to waste water which absorbs organic matter and heavy metals to form a sludge, separating the sludge from the water and reducing the water content to less than 60% by weight, and firing the sludge at a temperature of about 2000° F. to convert sludge particles to expanded ceramic particles.

U.S. Pat. No. 4,750,274 discloses a method and apparatus for the continuous drying of sludges in which scouring particles larger than sludge particles are added to the sludges passing through a rotary screw type indirect heat exchanger for removing sludge particles from the surface of the heat exchanger.

It is a principal object of the present invention to provide a method and apparatus for the treatment of waste organic sludges containing liquid solvents, resins and heavy metals for the recovery of liquid solvents, decomposition of the resins, and conversion of the sludge into a substantially chemically inert solid particulate or powder.

SUMMARY OF THE INVENTION

In its broad aspect, the present invention relates to a method for the separation and recovery of volatiles from an organic sludge containing about 1 to 80% by weight liquid solvents and 20 to 99% by weight solids comprising feeding said organic sludge containing the volatile liquids and a reagent powder material in an amount effective to form a mixture having a high surface area to a distillation vessel, heating said mixture to a temperature up to about 350° C. while advancing said mixture through the vessel for a time sufficient to distil a sufficient portion of the solvents to yield a solid residue granular powder or like particulate, condensing distilled solvents, and separately recovering the solid residue granular powder. The mixture of sludge and reagent powder material preferably is fed to a mechanical fluidized bed distillation vessel and is heated and fluidized under a partial vacuum in a non-oxidizing atmosphere, such as in a nitrogen atmosphere. The solid residue granular powder normally is comprised of a non-flammable mixture of up to 25 wt % solid resin, heavy metals, paint pigments such as calcium carbonate, silicon oxides, aluminum oxides, titanium oxides, and reagent powder.

In a preferred embodiment, the solid residue granular powder is heated under non-oxidizing conditions to a temperature sufficient to depolymerize the solid resin to produce a gaseous hydrocarbon, the hydrocarbon is condensed as a liquid product, and the solids residue is separately recovered. The solid residue preferably is heated to a temperature in the range of about 300° to 750° C. in an oxygen-free atmosphere such as in a nitrogen atmosphere for depolymerization of the contained resins to produce gaseous hydrocarbons, and said hydrocarbons recovered as a condensate. The solid residue powder can be heated to above about 200° C. and subjected to microwave energy at a wave energy frequency effective to decompose and depolymerize the resin. The solids residue can be used as an inert, environmentally safe raw material such as in the cement industry, recycled for use in the process as a reagent powder, or alternatively sintered at a temperature in the range of 750°–1150° C. to produce inert agglomerates.

BRIEF DESCRIPTION OF THE DRAWINGS

The process and apparatus of the invention will now be described with reference to the accompanying drawings, in which:

FIG. 3 is a graph of time versus temperature and drive motor amperage during processing of a batch of waste material in a mechanical fluidized bed reactor of the type illustrated in FIG. 2.

DESCRIPTION OF THE PREFERRED EMBODIMENT

Figure 1:
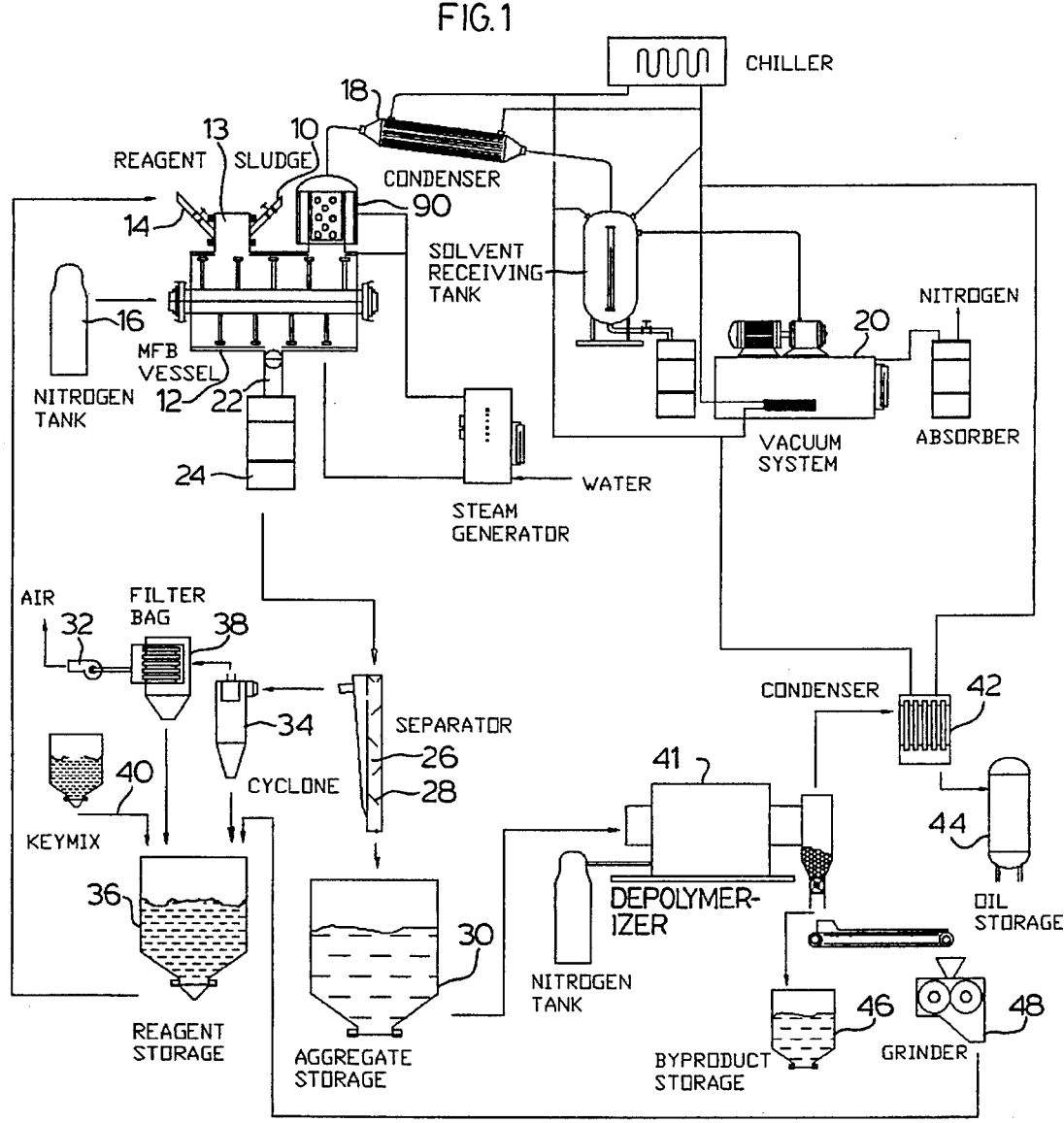
FIG. 1 is a schematic illustration of a flow sheet of the method of the present invention.

With reference to the flowsheet of FIG. 1, waste materials 10 such as flammable sludges and solids, for example, diatomaceous earth saturated with a volatile organic compound (VOC), semi-liquid and solid paint wastes, cleaners, spent solvents containing solids, solvent-soaked cartridges and filters, solvent-laden still bottoms, solvent-soaked carbon, and solvent and/or oil-contaminated earth, are fed to a processing vessel 12 through inlet 13 with a reagent powder material 14 capable of absorbing/adsorbing any liquid solvent and of forming an activated mixture for producing granules with large surface-to-volume ratios during mixing in the processing vessel.

Waste feed such as paint sludges, for example, containing hydrocarbons (solvents) in the amount of about 1 to 95% by weight solvents and about 5 to 99% by weight solids are homogenized, normally are passed through a magnetic screen to separate ferrous metals and other undesirable materials prior to charging to vessel 10. Vessel 10 preferably is a mechanical, fluidized bed reactor such as manufactured by Litteford Brothers Inc. of Florence, Ky.

The vessel will treat a paste or pseudo material to effect drying or solid phase concentration by solvent removal for discharge of solvent vapours for reclamation. The vessel will provide the dual functionality of heat and mass transfer while the materials treated are mechanically fluidized by high shear mixing. Mechanical fluidizing of the material is accomplished within the horizontal, cylindrical vessel by means of close-clearance, plough-shaped mixing elements mounted on a rotating shaft, to be described with reference to FIG. 2. The vessel 12 is completely jacketed to receive a heating fluid such as steam or oil and the contents of the vessel accordingly are not exposed to heating fluids and can operate at a vacuum over a wide range of temperatures. The vessel can also be directly heated by steam or hot nitrogen or other inert gaseous medium. It has been found in some applications, such as in the treatment of oil-contaminated earth, that an electrically-heated rotary kiln or conveyorized oven, such as referred to in application Ser. No. 299,979 filed Jan. 23, 1989, now U.S. Pat. No. 5,087,375 is suitable for the process of the invention.

The reagent powder may be a fine inorganic solid such as particulate albite, calcite, bauxite, borax, dolomite, feldspar potash, flint, kaolinite, kyanite, magnesite, mica, montmorillonite, nepheline, orthoclase, sillimanite, spodumene, talc, vermiculite, wollastonite, aluminum oxide, silica oxide, lead bisilicate, diatomaceous earth, zeolyte and Na/Ca borosilicate glass, or mixtures thereof. A reagent powder sold under the trade-mark KEYMIX™ is satisfactory for use in the method of the present invention. Although it is preferred that these fine inorganic solids are fresh, the fine inorganic solids can be supplied from waste streams of industrial processes and can comprise spent reagent powders such as fly ash, collector dust and furnace dust; bentonite with sand and resin from foundry installations; calcium oxide, calcium carbonate, unreacted calcium, clay and ferro-oxides in the form of lime or cement dust; titanium oxide contaminated with organics from the petrochemical and paint industries; absorbents such as bentonite and diatomaceous earth saturated with organics from chemical, beverage and food industries, micas, vermiculite and bentonite produced as agglomerates from waste streams which can be pulverized into powder; and bentonite and carbon from air filters such as used in the cleaning industries.

Spent reagent powders should contain a maximum of liquid, such as water or organic solvents or hydrocarbons, to yield a total liquid content in the reagent powder and the sludge mixture of less than about 48% by weight liquid. Excess liquids preferably are removed by preconditioning such as by passing the spent reagent powders through a drying chamber such as a rotating screened drum in which the particles can be particulated and sized while exposed to a flow of hot exhaust gases from the processing vessel 12 or the depolymerizer 41. The spent reagent powder can comprise up to 100% by weight of the reagent powder material.

The reagent powder used in the present invention may preferably comprise 40 to 50 wt. % of a mineralogical composition including the three-layer minerals illite, vermiculite, montmorillonite and chlorite.

A preferred reagent powder of the present invention comprises clay and/or aluminosilicates with a particle size passing through a 10 mesh Tyler sieve, preferably through a 70 mesh Tyler sieve. It is preferred to use a reagent powder with an average particle size less than about 5, preferably less than 1 in size. Clay has a long history of industrial use and, as a chemical reagent, it is safe to handle for coagulation, absorption, neutralization and dewatering of the waste material, and also to fix the waste material to the clay.

It has been found that up to about 99% by weight of the reagent powder material can comprise recycled powder or granules from the process of the invention, to be described.

The waste material is blended with the reagent powder material in an amount effective to provide a mixture of consistency and heated up to a temperature in the range of about 20° to 350° C. under atmospheric pressure or under a partial vacuum relative to atmospheric pressure, preferably within the range of 2 to 25 inches mercury. This amount will depend on the consistency and composition of the waste material and on the properties and compatibility of the reagent powder material. For most applications, about 5 to 70 wt. % of reagent powder material mixed with from about 30 to 95 wt % of waste will provide a mixture suitable as feed to the distillation vessel, the preferred range of reagent powder material to waste sludge being in the range of 1:0.6–2.5 with an optimum ratio of 1:1.

A non-oxidizing atmosphere such as provided by the addition of nitrogen gas 16 is preferred for the vacuum distillation of volatile liquid solvents. The sludge feed with reagent material is dispersed throughout a rotating bed for a retention time typically within the range of 50 to 75 minutes, while being heated to a temperature in the range of about 20° to about 350° C., preferably in the range of about 100° to 200° C. The reagent powder material provides additional surface area to facilitate vacuum distillation of the volatile hydrocarbons by increasing the area of solid/gas interface.

The volatilized hydrocarbons are condensed in condenser 18 as they exit from the vessel under a partial vacuum from vacuum system 20. Solid residues exit the vessel as a granular powder at 22.

Air and entrained fumes from separator 26 are passed under the negative pressure from the suction of fan 32 or a vacuum pump to a cyclone 34 in which the apex discharge from the cyclone is fed to hopper 36. The vortex discharge is fed to a bag filter 38 and collected solids are discharged to hopper 36. Reagent powder 40 can be added to the solids collected in hopper 36 for mixing therewith prior to recycle to vessel 12 at reagent inlet 14. A reagent powder material comprised of 1 to 70 wt % reagent powder described hereinabove and 30 to 99 wt % of recycled solids in hopper 36 has been found satisfactory.

Residue aggregate from hopper 30 containing about 1 to 25% by weight resin can be processed for the depolymerization of the resins and for recovery of hydrocarbons or used, for example, in the cement industry. The aggregate can be heated under an oxygen-free atmosphere in vessel 41 to a temperature in the range of about 200° to 750° C. for pyrolysis decomposition of the resin and production of distilled oil and solvents and a carbonaceous solid residue. The distillate is condensed in oil condenser 42 and passed to storage 44. The solids can be passed to storage 46 for use, for example, as a raw material for the cement industry or ground in grinder 48 to a powder and recycled to reagent storage hopper 36 for use with the reagent carrier in the present process.

Resin depolymerization can be effected by subjecting the residue aggregate heated by conventional heating, e.g. by electrical heating, in vessel 41 under an oxygen-free atmosphere to a temperature above about 200° C. to microwave energy at a wave energy frequency effective to decompose and depolymerize the resin.

Figure 2:
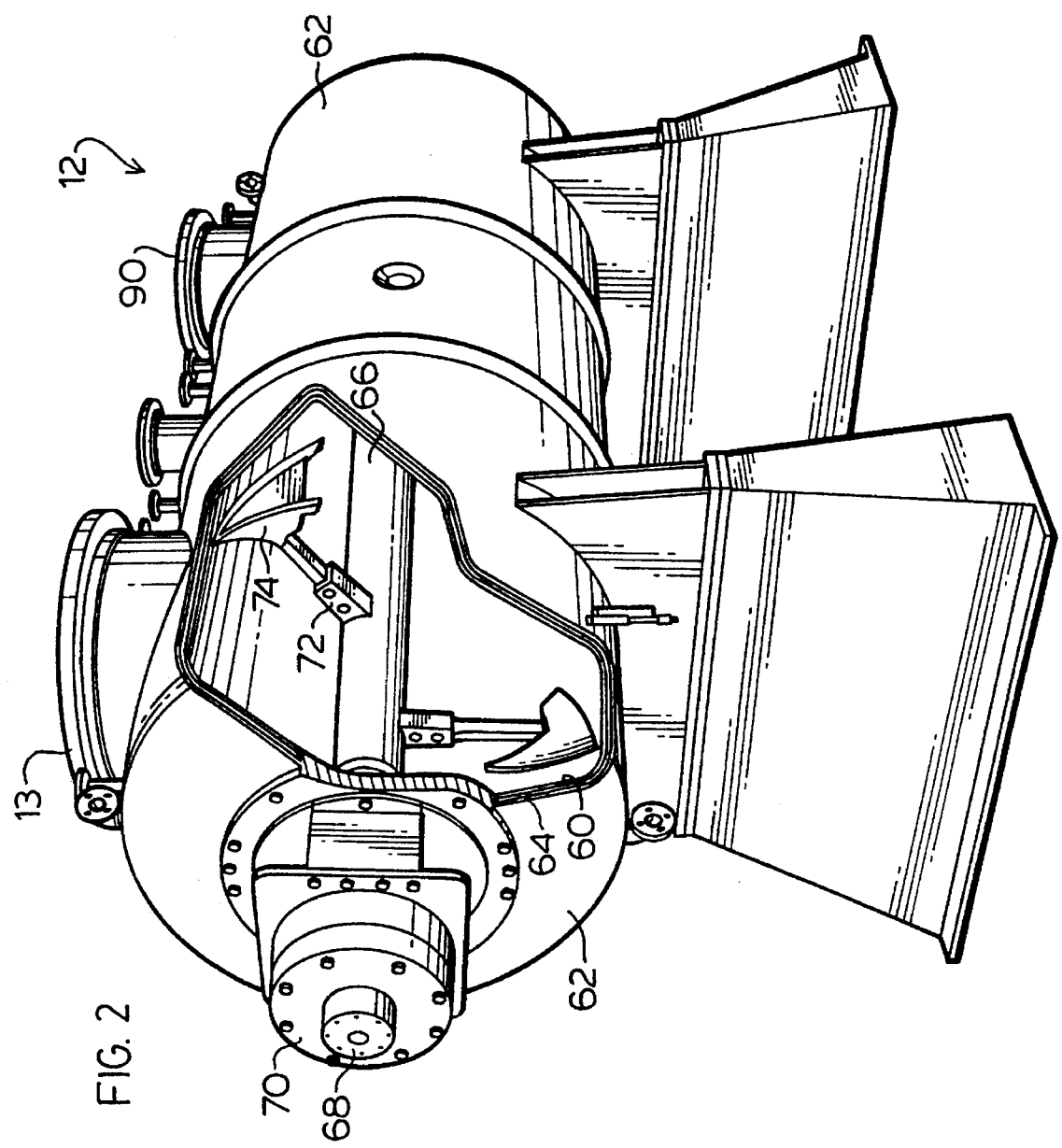
FIG. 2 is a perspective view of a mechanical fluidized bed distillation unit used in the method of the invention.

With reference now to FIG. 2, a mechanical, fluidized bed reactor for use in the process of the invention comprises an elongated pressure vessel 12 having a horizontal cylindrical corrosion resistant metal alloy inner wall 60 with a stainless steel shell or jacket 62 defining an annulus 64 for circulation therein of a heating medium such as steam or hot oil. A shear mixing and mechanical fluidizing mechanism includes a longitudinal shaft 66 journalled for rotation in bearing 68 at each end of vessel 12 and driven by a mechanical or hydraulic motor 70. Shaft 66 carries equispaced radial arms 72 supporting plow-shaped mixing elements 74 rotating at high speed within vessel 12 for creating a fluidized bed effect.

A vapour filter 90 allows discharge of gaseous streams such as volatilized hydrocarbons to condenser 18 (FIG. 1).

In operation, reagent powder material and sludge waste are fed to vessel 12 through inlet port 13, heated to a temperature in the range of 20° C. to 350° C. by the heating medium in annulus 64, and subjected to mixing and fluidization by the action of plow elements 74. A negative pressure is provided for enhanced discharge of gaseous products through heated vapour filter 90.

The mixture of material comprised of reagent powder material and organic sludge is granulated within vessel 12 by the shear action of plow elements 74 during heating of the mixture and distillation of solvents.

With reference to FIG. 3, a typical interrelationship of reactor temperature, condensate temperature and vapour temperature (°C.) and drive motor amperage (amps) is shown for a batch processing of a paint stripper sludge treated in a mechanical fluidized bed distillation vessel having a capacity of 1200 liters. At an initial vessel rotary speed of 50 revolutions per minute (RPM) and a final rotary speed of 100 RPM, with a gradual temperatures increase of the reactor and vapour temperature from 35° C. to about 85°–100° C., the drive motor amps increased for the first 40 minutes due to the increasing viscosity of the mixture and dropped during the last 50 minutes, notwithstanding an increase in rotation of the plow elements from 50 to 100 RPM, due to evaporation of solvents and to granulation of the mixture. The vacuum increased from 2 inches mercury (Hg) at initiation of the processing to 25 inches Hg at completion of processing.

The process of the invention will now be described with reference to the following non-limitative examples.

EXAMPLE 1

A paint stripper sludge having the composition shown in Table 1 was mixed with a reagent powder material comprised of at a ratio of plastic reagent powder material to sludge of 1:1 in a mechanical fluidized bed vessel of the type shown in FIG. 2 for about 90 minutes at an initial reactor temperature of 30° C. increasing to a final reactor temperature of about 100° C. under a negative nitrogen atmosphere commencing at 2 inches Hg and terminating at 25 inches Hg to a produce inert granules and a recovered solvent having the composition shown in Table 1.

TABLE 1

|  | Sludge Feed | Recovered Solvent (wt %) | Residue (wt %) |
| --- | --- | --- | --- |
| Solvent Content | 23% |  |  |
| Dichloromethane | 80% | 80% | 0.35 |
| Phenol | 10% | 10% | 0.1% |
| Formic Acid | 5% | 5% | — |
| Cresol | 3% | 3% | 0.05% |
| Dodecyl Benzene Sulfonic Acid | 2% | 2% | — |
| Resin Content | 19% | — | 9% |
| Solid Content | 58% | — | 90.5% |
| Flash Point | 35° C. |  | none up to 200° C.* |
| Boiling Range | 40°–150° C. | — |  |
| Spec. Gravity | 1060 kg/M$^3$ |  | 1310 kg/M$^3$ |

*According to Transportation of Dangerous Goods Act

EXAMPLE 2

A paint sludge having the composition shown in Table II was mixed with a reagent powder material at a ratio of reagent material to sludge of 3:2 in a mechanical fluidized bed vessel of the type shown in FIG. 2 for about 90 minutes an initial reactor temperature of 30° C. increasing to a final reactor temperature of about 200° C. under a nitrogen atmosphere commencing at 2 inches Hg and terminating at 25 inches Hg to a produce inert granules and a recovered solvent having the composition shown in Table II.

TABLE II

|  | Sludge Feed (wt %) | Recovered Solvent (wt %) | Residue (wt %) |
| --- | --- | --- | --- |
| Solvent Content | 26% | 25.8% | — |
| 2-Heptanone | 50.8% | 50.8% | — |
| Butanol | 15.8% | 15.8% | — |
| 2-Propanol | 3.5% | 3.5% | — |
| 2-Pentanone | 5.9% | 5.9% | — |
| Mineral Spirits | 3.4% | 3.4% | — |
| 2-Butoxy Ethanol Ethyl, Glycol | 10.9% | 10.9% | — |
| Butyl Eth. Act | 9.7% | 9.6% | — |
| Resin Content | 35% | — | 10.8% |
| Solid Content | 39% | — | 89.2% |
| Flash Point | 45° C. |  | none up to 200° C.* |
| Boiling Range | 85°–180° C. | — |  |
| Spec. Gravity | 990 kg/M$^3$ |  | 1230 kg/M$^3$ |

*According to Transportation of Dangerous Goods Act

EXAMPLE 3

A typical sludge, powdered residue and aggregate from the process of the invention were analyzed by the Leachate Extraction Procedure (Ontario R.R.O. 1980, Regulatory 309), as shown in Table III

TABLE III

| Sample | Wt. of Sample (%) | Final Volume Leachate (ml) | Acetic Acid (ml) | pH initial/final | |
| --- | --- | --- | --- | --- | --- |
| Sludge | 50.14 | 990 | 33.4 | 8.4 | 5.0 |
| Non-Flammable Powder | 4.46 | 845 | 36.5 | 8.5 | 5.9 |
| Aggregates | 32.78 | 656 | 3.7 | 6.0 | 5.1 |

EXAMPLE 4

The leachate from Example 3 was subjected to an ICAP Plasma Scan with the results shown in Table IV.

TABLE IV

|  | Sludge (Mg/l) | Residue By-Product (Mg/l) | Product (Mg/l) | Req 309 Limit (Mg/l) |
|---|---|---|---|---|
| Chromium | 11.25 | 7.30 | 0.2 | 5.0 |
| Lead | 0.05 | 0.05 | 0.05 | 5.0 |
| Zinc | 0.10 | 1.40 | 0.02 | N/A* |
| Strontium | 24.0 | 19.0 | 0.5 | N/A* |

*Not Available

EXAMPLE 5

The results from the treatment of 10 paint sludges processed according to the steps of Example 2 were averaged, as shown in Table V. The "309 REGULATORY" was referred to in Examples 3 and 4 infra. The "TCLP REGULATORY" is the Toxic Characteristic Leaching Procedure issued under the Toxicity Characteristic rule by the Environmental Protection Agency on Mar. 29, 1990 for control under Subtitle C of the Resource Conservation and Recovery Act. The TCLP is a test designed to simulate climatic leaching action expected to occur in landfills.

TABLE V

| COMPOUND NAME | TCLP REGULATORY MG/L | 309 REGULATORY MG/L | GRANULES 309/TCLP MG/L |
|---|---|---|---|
| Arsenic | 5.0 | 5.0 | <0.001/<0.001 |
| Barium | 100.0 | 100.0 | <0.05/<0.05 |
| Benzene | 0.5 |  | 0.0061 |
| Cadmium | 1.0 | 0.5 | 0.010/0.017 |
| Carbon Tetrachloride | 0.5 |  | 0.0039 |
| Chlordane | 0.03 | 0.7 | N/A |
| Chlorobenzene | 100.0 |  | 0.0164 |
| Chloroform | 6.0 |  | 0.0038 |
| Chromium | 5.0 | 5.0 | 2.4/0.92 |
| o,m,p Cresol | 200.0 |  | 0.003 |
| 1,4 Dichlorobenzene | 7.5 |  | 0.005 |
| 1,2 Dichloroethane | 0.5 |  | 0.0122 |
| 1,1 Dichloroethylene | 0.7 |  | 0.0068 |
| 2,4 Dinitrotoluene | 0.13 |  | 0.002 |
| Endrin | 0.02 | 0.02 | N/A |
| Heptachlor | 0.008 | 0.3 | N/A |
| Hexachlorobenzene | 0.13 |  | 0.002 |
| Hexachloro-1,3-butadiene | 0.5 |  | 0.006 |
| Hexachloroethane | 3.0 |  | 0.002 |
| Lead | 5.0 | 5.0 | <0.09/0.26 |
| Lindane | 0.4 | 0.4 | N/A |
| Mercury | 0.2 | 0.1 | <0.0005/<0.0005 |
| Methoxychlor | 10.0 |  | N/A |
| Methyl ethyl ketone | 200.0 |  | 0.285 |
| Nitrobenzene | 2.0 |  | 0.020 |
| Pentachlorophenol | 100.0 |  | 0.005 |
| Pyridine | 5.0 |  | 0.026 |
| Selenium | 1.0 | 1.0 | <0.001/<0.001 |
| Silver | 5.0 | 5.0 | <0.03/<0.03 |
| Tetrachloroethylene | 0.7 |  | 0.0497 |
| Toxaphene | 0.5 | 0.5 | N/A |
| Trichloroethylene | 0.5 |  | 0.057 |
| 2,4,5 Trichlorophenol | 400.0 |  | N/A |
| 2,4,6 Trichlorophenol | 2.0 |  | 0.004 |
| 2,4,5 TP | 1.0 | 1.0 | N/A |
| Vinyl Chloride | 0.2 |  | 0.0001 |
| 2,4-D | 10.0 | 10.0 | N/A |
| Aldrin, Dieldrin |  | 0.07 | N/A |
| Boron |  | 600.0 | 0.015 |
| DDT |  | 3.0 | N/A |
| Cyanide (free) |  | 20.0 | N/A |

| COMPOUND NAME | TCLP REGULATORY MG/L | 309 REGULATORY MG/L | GRANULES LEACHATE MG/L |
|---|---|---|---|
| Methyl Paration |  | 0.7 | N/A |
| Fluoride |  | 240.0 | N/A |
| Trihalomethanes |  | 35.0 | N/A |
| Uranium |  | 2.0 | N/A |
| Carbaryl/1-Naphthyl-N-methyl carbamate/Sevin |  | 7.0 | N/A |
| PCBs |  | 0.3 | N/A |
| Paration Diazinon/Phospordithioic acid,0,0-dietnyl 0-(2-isopropyl |  | 3.5 | N/A |

TABLE V-continued

| | | |
|---|---|---|
| 6-methyl-4-pyrimidinyl)ester | 0.02 | N/A |
| Nitrate, Nitrite | 1000.0 | N/A |
| Nitrilotriacetic acid | 5.0 | N/A |
| Nitrite | 100.0 | N/A |
| Methoxychlor/1,1,1-Trichloro-2,2-bis(p-methoxyphenyl)ethane | 10 | N/A |

N/A: Not applicable - input feed evulated by quality control.

The following example illustrates the process of the invention for treating earth or soil contaminated with petroleum hydrocarbons and, solvents.

EXAMPLE 6

Soil contaminated with petroleum hydrocarbons, e.g. chlorinated and non-chlorinated solvents, was mixed with about 3 to 10% by weight of KEYMIX™ absorbent to open the matrix of the soil and to increase reactive surface area. The soil-absorbent mixture was fed to a rotary kiln and heated to about 200° C. for vaporization of moisture and organic compounds such as solvents. The temperature was increased up to about 510° C. under a nitrogen atmosphere for depolymerization and vaporization of heavy hydrocarbons. The vaporized moisture, solvents and oil were removed with nitrogen for processing in a vapour recovery unit in which condensate was separated into an organic stream, water stream and nitrogen stream. The organic stream was recovered as an oil product, the gaseous portion of which was liquified and stored, water was discarded as an environmentally-safe product, and pure nitrogen recovered for re-use. The decontaminated soil was cooled and returned to its original site.

The following examples illustrate the process of the invention for sludges containing heavy metals.

EXAMPLE 7

The on-site method of treating of waste water and sludge generated from recycling metals from car destruction facilities having a high content of Cu and Pb was achieved according to the process of the present invention. The waste water containing organic waste was mixed with 5% powdered clay to improve coagulation, flocculation, sedimentation and homogeneity of the waste. The organic sludge generated from the sedimentation process consisted of 31 wt % organic material (oil), 28 wt % $H_2O$ solution with NaOH (weak) and 51% solid parts (clay, metals and heavy metals). Organic sludge was mixed with clay (shale) powder and 1 wt % inorganic absorbent (Na/Ca borosilicate expanded glass), at a weight ratio of 2:1 (sludge:clay). This mixture was then shaped to formgranules. The stable solid granules were transferred to a conveyorized electric oven where they were heated and dried for 35 minutes at a temperature of 100° C.–200° C. to 96 wt % solids for volatilizing water and solvents. The material was then heated to 460° C. in an oxygen-free environment for 25 minutes for pyrolysis of hydrocarbons. This produced gases which were condensed to oil. The remaining solid was calcinated and sintered in a conveyorized electrically heated kiln for 12 minutes at 1050° C. and this produced inert granules with a particle size of 7 mm, a density of 630 kg/m³, a specific gravity of 800 Kg/m³, a pH value of 7.3 and a temperature resistance up to 1050° C. The material produced can be used in the building industry as raw material or a filler.

EXAMPLE 8

The on-site treating of paint sludge was performed according to the process of the present invention. The paint sludge generated from distillation of solvent (dry distillation) and consisting of 15 wt % solvent and 85 wt % solids (non-metallic elements, for example S, P, metallic elements, for example Co, Mn, Pb, Zn, Cr, Ti, and organic constituents, for example polymers, alcohols, ketones, esters) was mixed with plastic clay (shale) powder which included 2 wt % inorganic absorber (Na/Ca borosilicate expanded glass) in a weight ratio of 3:2 (sludge:clay). This mixture was then shaped to form granules of 10 mm size. The stable solid granules were transferred to an electrically heated vacuum reactor in a nitrogen atmosphere and solvent material was distilled therefrom for 30 minutes at 150°–200° C. and condensed. The remaining solid was calcinated and sintered in a conveyorized electrical calcinator for 10 minutes at 500° C. which produced inert granules with a bulk density of 800 kg/m³, a specific gravity of 730 kg/m³ and a pH value of 7.1. The material was safe to use for the building industry as raw material or as filler.

EXAMPLE 9

The method of treating sodium dichromate effluent and waste solution on-site was achieved according to the process of the present invention. Effluent generated from chrome plating containing 31% sodium dichromate waste solution was mixed with material (clay, expanded glass, acrylamide copolymer and 3 wt % of nepheline). The weight ratio was 1:1 of solution: material. This mixture was then mixed for 25 minutes in a mechanical fluidized bed under a negative nitrogen atmosphere to formgranules at 150° to 200° C. The dry granules were mixed a second time with waste solution 1:1 plus 3 wt % absorbent in the mechanical fluidized bed at 200° C. to form additional granules which were conveyed to a conveyorized kiln for firing at 1120° C. for 11 minutes. The resulting solid granules were inert and safe to use as raw material for (gunning) refractories, particularly fire protecting systems and as an additive for abrasives.

EXAMPLE 10

The method of treating zinc sludge was achieved according to the process of the present invention.

The composition of zinc sludge from metal industries had the following chemical composition:

| | |
|---|---|
| Water | 35.11% |
| Ash | 27.17% |
| Zinc | 320 g/kg wet material |
| Iron | 26.4 g/kg wet material |
| Chromium | 0.564 g/kg wet material |
| Lead | 9.78 g/kg wet material |

The above zinc sludge was mixed with 50% clay, 3% nepheline and 6.5% flint. The mixture was added into a mechanical fluidized bed reactor where with adjustable rotation speed and temperature a desirable dimension of granulates was achieved.

The granules were then thermally treated with a graduated temperature from 20° C.–990° C. with a retention time of 9 minutes.

For thermal treatment a continual indirect heating system, a commercially available belt system, a tube system and a roll system was used.

During thermal preparation—calcination and sintration—a very stable spheric product was produced with low density spheres containing a multiplicity of independent closed air cells surrounded by a unique tough outer shell. The granulates had the following properties:

| | |
|---|---|
| Sphere size range: | 0.5–15 mm |
| Bulk density: | 400–500 kg/m$^3$ |
| Specific gravity: | 600–700 kg/m$^3$ |
| Surface characteristics: | Hydrophilic |
| Color: | brown, grey |
| Odor: | none |
| Thermal stability | 1000° C. |

The product may be used as controlled size aggregates for lightweight structural concrete, lightweight pre-fab concrete units, castable and/or gunning refractories, insulation blocks, gypsum wallboard and roofing systems.

It will be understood that modifications can be made in the embodiment of the invention illustrated and described herein without departing from the scope and purview of the invention as defined by the appended claims.

We claim:

1. A method for the separation and recovery of volatile solvents from an organic sludge containing about 1 to 95% by weight volatile liquid solvents and 5 to 99% by weight solids, comprising: feeding said sludge containing the volatile liquid solvents and a reagent powder material in an amount effective to form a mixture having a high surface area to a distillation vessel, heating said mixture to a temperature up to about 350° C. while advancing said mixture through the vessel for a time sufficient to distill a sufficient portion of the volatile solvents to yield a solid residue powder, condensing distilled solvents, and separately recovering the solid residue powder.

2. A method as claimed in claim 1 in which said vessel is a mechanical fluidized bed distillation vessel and said mixture is fluidized while being heated therein.

3. A method as claimed in claim 2 wherein the mixture of sludge and reagent powder material is heated and fluidized under a partial vacuum in a non-oxidizing atmosphere.

4. A method as claimed in claim 1 in which the effective amount of reagent powder material comprises about 5 to 70 wt % of the mixture.

5. A method as claimed in claim 3 in which the mixture of sludge and reagent powder material comprises about 5 to 70 wt % reagent powder material and about 30 to 95 wt % sludge waste.

6. A method as claimed in claim 4 in which the reagent powder material comprises about 1 to 70 wt % reagent powder and about 30 to 99% solid residue powder, said reagent powder material passing 10 mesh Tyler series.

7. A method as claimed in claim 2 in which the reagent powder material comprises about 1 to 70 wt % reagent powder and about 30 to 99 wt % recycled solid residue powder, said reagent powder material passing 10 mesh Tyler series.

8. A method as claimed in claim 2 in which the mixture is heated to a temperature in the range of about 20° to 200° C.

9. A method as claimed in claim 3 wherein the solid residue powder is granular and is comprised of a mixture of solid resin, heavy metals and reagent powder.

10. A method as claimed in claim 9 wherein said solid residue granular powder is heated under non-oxidizing conditions to a temperature sufficient to depolymerize the solid resin to produce a gaseous hydrocarbon, condensing the hydrocarbon as a liquid product, and separately recovering the solids residue.

11. A method as claimed in claim 10 in which the solid residue powder is heated to a temperature above about 200° C. and subjected to microwave energy at a wave energy frequency effective to decompose and depolymerize the resin.

12. A method as claimed in claim 4, heating the solid residue to a temperature in the range of about 400° to 750° C. in an oxygen-free atmosphere for depolymerization of contained resins to produce gaseous hydrocarbons, recovering said hydrocarbon and sintering the solids residue at a temperature in the range of 750°–1150° C.

13. A method as claimed in claim 3 in which the reagent powder contains up to 100% by weight spent reagent powder.

14. A method as claimed in claim 13 in which the spent reagent powder contains a maximum of liquid to yield a total liquid content in the mixture of the reagent powder, spent reagent powder and the sludge of less than 48% by weight liquid.

* * * * *